United States Patent Office 2,897,936
Patented Aug. 4, 1959

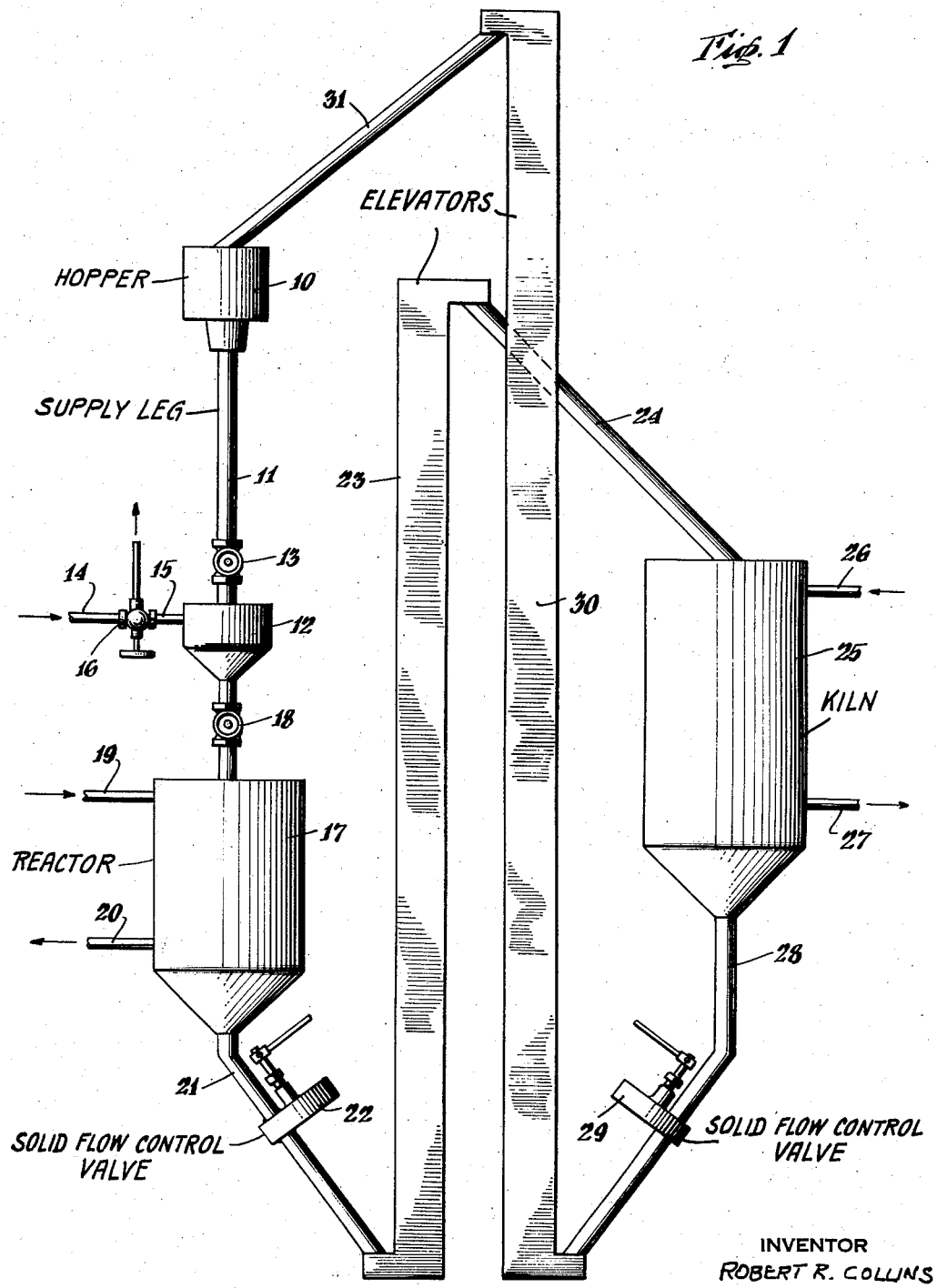

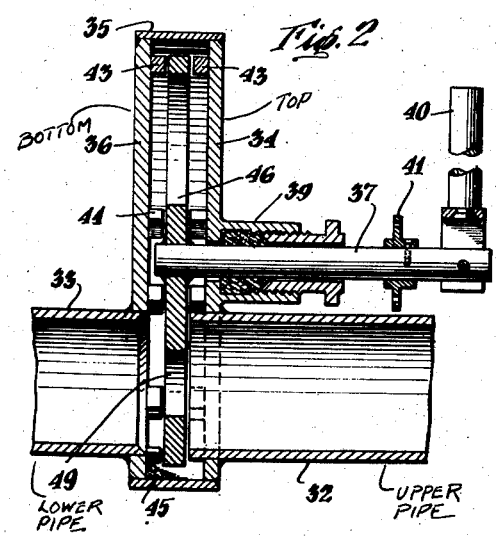
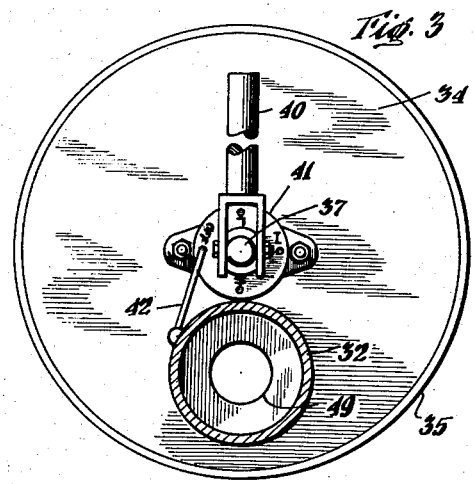
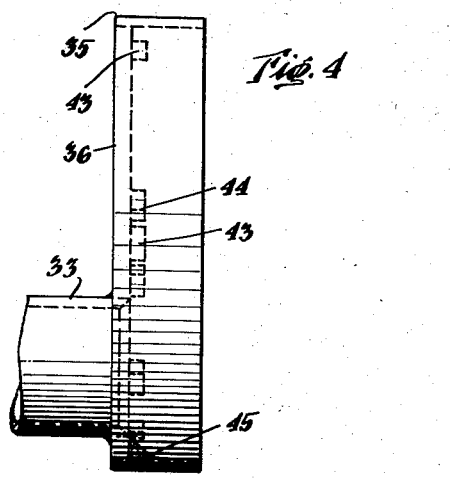
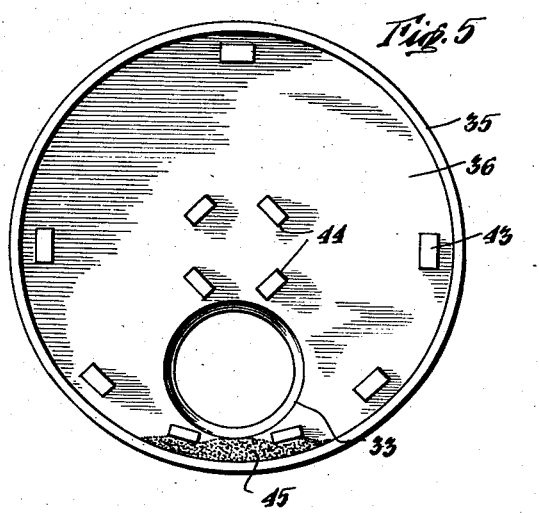
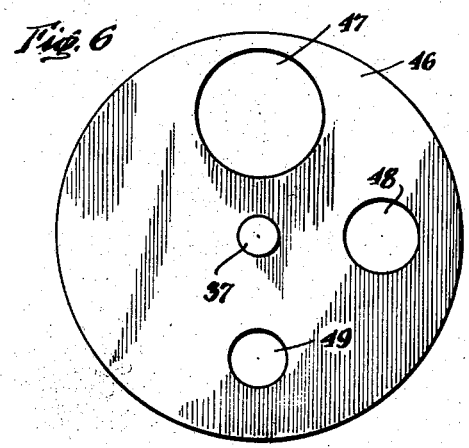
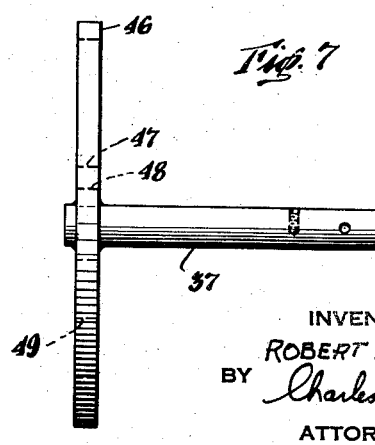

2,897,936

MOVING BED FLOW CONTROL VALVE

Robert R. Collins, Beaumont, Tex., assignor to Socony Mobil Oil Company, Inc., New York, N.Y., a corporation of New York Application January 5, 1956, Serial No. 557,491

2 Claims. (Cl. 193—32)

This application is directed to an improved flow control valve for controlling the flow rate of a gravitating compact column of granular particles. In its more detailed aspect, it is directed to a valve for adjusting the flow of compact columns of granular material in a continuous moving bed process in which the granular material is passed continuously in compact form through one or more gas solids contacting vessel. These valves find particular application in various hydrocarbon conversion processes of the moving bed type in which a granular catalyst is passed as a compact stream through a reaction zone at a desired flow rate where it is contacted with hydrocarbons and the desired flow rate is maintained by appropriate adjustment of a valve in the catalyst withdrawal stream from the reaction zone.

The moving bed conversion process has been widely used in the past for the continuous cracking of heavy hydrocarbons to produce lighter hydrocarbons in the gasoline boiling range. In this process, a granular contact catalyst is gravitated continuously into the top of the reaction vessel and through the reaction vessel as a continuously gravitating bed. The reactants, properly prepared for conversion, are introduced into the vessel and passed through the voids in the bed with the conversion products being withdrawn therefrom at a suitable location. The reaction zone is maintained at an elevated temperature, such as about 800° F. to 1000° F., and at an elevated pressure. During conversion, a carbonaceous contaminant is deposited on the catalyst, causing a reduction of its catalytic activity. The spent catalyst is withdrawn from the bottom of the reaction zone as a compact gravitating stream and is transferred to the top of a regeneration zone. The catalyst is gravitated through the regeneration zone as a continuously compact mass and is contacted therein with a suitable combustion-supporting gas, such as air, to effect removal of the carbonaceous contaminant from the solids. The combustion causes the temperature of the solids to rise and this temperature must be controlled so that the catalyst is not heated to a heat damaging temperature level. The temperature in the kiln or regeneration zone may range from about 1000° F. to 1300° F., and the pressure is normally about atmospheric. The re-heated and regenerated catalyst is withdrawn from the bottom of the regeneration zone as a compact stream and returned to the top of the reaction zone for re-use in the process.

The rate of flow of the catalyst particles through the reaction and regeneration zone is dependent, to some extent, upon conditions occurring within these zones and may vary at times over a fairly substantial range of flow rates. When the reactions occurring in the reaction zone are highly endothermic, a considerable amount of heat is taken from the catalyst in the reaction zone and this will cause a drop in temperature in the zone, which may drop the temperature below the reaction temperature. In order to counteract this, it is sometimes desirable to increase the flow rate of the catalyst through the reaction zone and this is done by control of the flow rate of the stream of catalyst being withdrawn from the reaction zone. Various types of valves have been tried in the catalyst stream below the contacting vessels to effect the desired control of flow rate of catalyst in the system. For example, star wheels have been used in which a rotating member, with a series of buckets or chambers, continuously remove the solid material at a rate controlled by the speed of rotation of the wheel. These wheels have failed largely because of the abrasive action of the catalyst material. The granular particles tend to break into fines and the fines tend to jam the moving parts. The continuous rubbing of the catalyst against the metal causes rapid wear of the metal, requiring repair and replacement. Various types of valve and tank arrangements have also been utilized, but these similarly failed because of the abrasive action of the catalyst particles and because of the tendency of the moving parts to jam under the influence of the dust formed by the breakage of the catalyst. Another type of flow control arrangement which has been utilized involves the use of a sliding plate valve which has a substantially horizontal plate which can be reciprocated in a horizontal direction so as to interrupt the downward transfer of more or less of the catalyst as desired to reach the specified flow control rate. The sliding plate valves have been more successful than the other types of apparatus attempted but they are still subject to jamming as a result of particles of catalyst migrating into the clearance between the moving and stationary particles of the sliding plate valves. This jamming of the valve makes it necessary to use excessive force in order to open or close the valve and in some instances makes it impossible to operate the valve without repair.

The granular material involved in these processes generally has a broad size range of about $\frac{1}{16}''$ to approximately 1'', but is preferably in the range of about $\frac{1}{8}''$ to $\frac{1}{4}''$ in diameter. The particles are formed from various natural and treated clays, such as montmorillonite, bentonite, and the like. The granular catalyst has also been formed synthetically as combinations of silica and alumina, silica and magnesia, and various metal and other types of addition agents have been added for particular purposes. Commercial moving bed processes today generally utilize a synthetic bead type catalyst formed of materials found necessary for the particular conversion or operations involved.

The object of this invention is to provide an improved flow control apparatus for use in controlling the flow rate of a moving gravitating mass of granular solid contact particles. It is a particular object of this invention to provide a simple valve which will effectively control the flow rate of a gravitating compact column of granular catalyst particles at variable flow rates. It is a particular object of this invention to provide a variable flow control valve for use in the continuous moving bed hydrocarbon conversion process, which will control the flow rate of a gravitating stream of the contact material at the desired flow rate with maximum efficiency and minimum operating difficulties.

The invention involves, in one of its aspects, a circular disc type valve in which the circular disc type valve plate is surrounded by a generally cylindrical housing which can be mounted in a gravitating catalyst stream so that the catalyst gravitating through the valve is maintained away from the moving and operating portions of the valve at all times and the valve is so arranged that catalyst and dust drains out of the valve to keep it free and easily operable. The invention will be understood more readily in the following detailed description and with reference to the following figures, in which;

Figure 1 is a schematic showing of a continuous moving bed system in which the valve of this invention is used to control the flow rate of the catalyst through reaction and regeneration vessels;

Figure 2 is a schematic showing of the valve in vertical cross-section;

Figure 3 is a schematic showing of the top plan of the valve;

Figure 4 is a sectional view of the valve body;

Figure 5 is a cross-sectional plan view of the valve body;

Figure 6 is a plan view of the circular disc of the valve;

Figure 7 is a side view of the circular disc of the valve.

Referring now to Figure 1, there is shown a complete cyclic process which may be a process for the continuous reforming of gasoline to provide a gasoline product of improved motor qualities. Such a process is presently being used commercially and is known as the TCR process. In the TCR process, the granular catalyst is gravitated downwardly from a hopper 10 through a supply leg 11 into a pressure chamber 12 when the valve 13 is in the open position. When the valve 13 is closed, gas under pressure is introduced from the conduit 14 through the conduit 15, into the vessel 12 by suitable adjustment of the three-way valve 16. When the pressure in the vessel 12 is substantially equal to the pressure in the reactor 17, the valve 18 is opened, allowing the contents of the vessel 12 to enter the reactor 17. A naphtha charge is introduced continuously into the reactor through the conduit 19 at a location near the upper end of the reactor. The naphtha passes through the bed of catalyst in the reactor and the temperature and pressure conditions are maintained in the reactor such that the naphtha charge is modified to the desired extent. The reaction product is continuously removed from the reactor 17 through the conduit 20 to further treating apparatus, not shown. The catalyst is continuously gravitating as a compact bed through the reactor and is continuously withdrawn from the reactor through the conduit 21 attached to the bottom of the vessel. Slugs of the catalyst are cyclically introduced into the top of the vessel, as above described, at intervals frequently enough to maintain the reaction vessel substantially full of the catalytic material. The flow rate of the solids through the reactor is controlled by the flow control valve 22 located in the discharge line 21. The details of this valve will be described hereinafter. The catalyst particles, after passing through the valve 22, enter the lower end of an elevator 23 and are elevated to the top end of a conduit 24. The particles passing through the conduit 24 enter the top of a regeneration zone or kiln 25 and pass as a compact moving mass of solids through this vessel. Air is introduced into the kiln at one or more loctations, such as conduits 26, and the flue gas formed during combustion of the carbonaceous material on the catalyst is removed from the kiln through one or more conduits, such as 27. The regenerated and reheated catalyst is withdrawn as a compact stream from the bottom of the kiln through the conduit 28 and the flow rate of the moving bed of solids in the kiln is controlled by a valve 29 located in the conduit 28 at a suitable location, the details of the valve being the same as that shown at detail 22. The catalyst, after passing through the valve 29, enters a second elevator 30 and is raised to the top of the conduit 31. The catalyst passes through the conduit 31 into the hopper 10, thereby completing the enclosed cyclic path. While the temperature of the catalyst varies during transfer through the cyclic system, it is at all times at a substantially high temperature and, therefore, the metal and other members of the system must be selected to provide for the continuous transfer of this hot and abrasive material. In order to prevent excessive temperature of the catalyst at any location in the system, indirect heat exchangers may be used in the catalyst line. These heat exchangers are also used to provide necessary heat balance in the system, either adding or withdrawing necessary heat.

Turning now to Figures 2 and 3, which show a vertical cross-section of the valve and a plan view of the exterior of the valve, the details of how the valve is connected into the continuous pipe system is there shown. The portion of pipe 32 is a portion of the catalyst transfer pipe located about the valve. The portion of the pipe 33 is a position of the catalyst transfer pipe located below the valve. The top of the valve is a circular flat plate 34, which is welded to a cylindrical housing 35 and which, in turn, is welded to a flat circular bottom plate 36, thereby forming the enclosed housing of the valve. The valve must be rotated from its position as shown on Figure 2, to place the pipes 32 and 33 in a relatively steep angle with the horizontal. It is preferable, however, that the pipes slope sufficiently that the main portion of the valve and housing is above the conduits 32, 33, thereby preventing particles from migrating up into the recesses of the valve. Projected through the center and top of the valve is an axle 37, which is mounted for rotation. Attached to the end of the rotatable axle 37, within the valve housing, is a circular valve plate 46. The valve plate 46 covers practically the entire cross-section of the valve. Fastened about the rotatable axle 37 and attached to the top plate 34 of the valve, is a packing gland 39 designed to effectively seal the space between the rotatable axle and the top plate 34. Attached to the outer end of the rotatable axle 37 is a handle 40 which provides the leverage necessary to effect rotation of the axle. Attached about the axle 37 is an indicator plate 41, which is in the nature of a flat disc. This indicator disc 41 is in fixed position on the axle 37, and is marked at various locations as shown in Figure 3. The markings, S, I, L, and Off, which appear on the indicator plate, denote the position of the valve plate with reference to the catalyst transfer line and show that the small, intermediate or large apertures in the valve plate are in alignment with the transfer pipe, thereby providing the desired flow rate. The Off position merely indicates that the valve plate is in a position which completely blocks the flow of catalyst through the valve and that, therefore, the catalyst flow has been stopped. Attached to the conduit 32 is an elongated metal member 42. This member is pivoted for movement at one end to the conduit 32 and has at its other end a bent portion which is adapted to fit into a hole in the indicator plate 41 when that plate is in the appropriate position. The metal member 42 acts as a locking means, therefore, to insure that the desired aperture in the valve plate is kept in suitable alignment with the two ends of the transfer pipe to insure continuous flow of catalyst at the desired rate. Within the valve housing are bearing members 43 near the outer edge of the disc plate and 44 near the inner edge of the disc plate. These bearing members have sufficient clearance to permit ready movement of the valve plate but are designed to prevent any substantial misalignment of the valve plate which will cause the valve to jam. The valve is designed to be inserted in a transfer pipe located at a fairly steep angle with the horizontal. It is generally recommended that the transfer pipe be at an angle of about 30 to 45 degrees with the vertical for best operation of the valve. In this position, the pipes 32 and 33 are located at the lowest point of the valve with the remainder of the valve housing being located above the pipes 32 and 33. In this position, it is desirable to locate in the bottommost portion of the housing a filler, such as weld metal, to prevent fine particles of catalyst from accumulating in the lowermost section of the valve. The filler is preferably located so as to have a sloping surface, which surface is at such an angle that the particles will roll down the surface of the metal into the outlet conduit 33 when the valve is installed in the system. This angle will depend, to some extent, upon the material being transferred, but generally will be in the nature of 30 to 35 degrees with the horizontal.

Figures 4 and 6 show the cylindrical member 35 and the bottom of the valve 36 with the discharge pipe 33 attached thereto. These figures show more clearly the bearing members 43 and 44, which are located at uniform points around the bottom of the valve so as to provide the desired alignment without introducing excessive friction into the valve. The filler 45 is shown somewhat more clearly on these views, being designed to prevent the accumulation of fine particles in the lower section of the valve during operation. In this connection it is desirable, although not absolutely necessary, to project the upper catalyst conduit 32 through the top 34 of the valve to a point as close to the valve plate 46 as is tolerable without causing contact between the pipe and the valve plate. This prevents an excess amount of the fine particles from passing through the clearance between the valve plate and the pipe and around the valve plate rather than through the aperture in the plate.

The valve plate is shown in more detail on Figures 6 and 7. As is seen, the valve plate is centrally attached to the end of the rotatable rod 37 in fixed position. The valve plate has apertures 47, 48 and 49 in graded size located uniformly close to its outer periphery. These apertures are sized to provide the flow rate of the catalyst which will be anticipated for use in the process.

It is intended that the scope of this invention be considered broadly to cover all changes and modifications of the examples of the invention herein chosen for purposes of disclosure which do not constitute departures from the spirit of the invention.

I claim:

1. A system for the flow of a compact gravitating stream of granular contact particles comprising in combination a first conduit, a second conduit and a valve connecting said conduits for controlling the flow between said conduits, said valve comprising a valve housing having a cylindrical wall and a circular flat top and bottom members connected to form a unitary structure, the valve housing being mounted with its axis at an angle greater than the angle of repose of all the material being transferred and not exceeding about 45 degrees with the horizontal, a rotatable shaft centrally located within said valve housing, with one end projected through the center of said housing, a circular disc plate centrally attached to the end of said rotatable shaft within said housing, bearing members within said housing adapted to prevent misalignment of said circular disc plate without impeding rotary motion thereof, a dust tight packing about the exterior of said rotatable shaft and attached to said housing, means attached to the exterior of said rotatable shaft for rotating the shaft, the said first conduit attached to the top of said housing at a location substantially displaced from the center thereof and at substantially the lowest elevation of said top, the portion of said second conduit attached to the bottom of said housing being in substantial alignment with the portion of said first conduit attached to the top of said housing and cooperating therewith for transfer of a compact gravitating column of solids from the first to the second conduit, the end of said portion of the first conduit and the end of said portion of the second conduit being spaced away from the surface of the disc plate so as to avoid physical contact between the conduit ends and the disc plate, said circular disc plate being provided with apertures near its outer edge located uniformly about the circular disc plate and graded in size, said apertures adapted to be brought separately into alignment with the first and second conduits, whereby the flow of granular contact particles through the conduits is controlled at the desired flow rate.

2. The combination of claim 1 further characterized in that a fixed filler is provided within the housing at the lowermost point and adjacent the end of said portion of the second conduit, said filler sloping downwardly from the cylindrical wall of the valve housing to the end of the second conduit, whereby solid particles passing around the edge of the disc plate are caused to pass directly into the outlet of valve housing.

References Cited in the file of this patent
UNITED STATES PATENTS

| | | |
|---|---|---|
| 689,444 | Williams | Dec. 24, 1901 |
| 1,982,754 | Peterson | Dec. 4, 1934 |
| 1,992,552 | Stover | Feb. 26, 1935 |
| 2,631,759 | Hoopes | Mar. 17, 1953 |